United States Patent
Newman et al.

(10) Patent No.: US 10,741,808 B2
(45) Date of Patent: Aug. 11, 2020

(54) UNIFIED BATTERY MODULE WITH INTEGRATED BATTERY CELL STRUCTURAL SUPPORT

(71) Applicant: NIO USA, Inc., San Jose, CA (US)

(72) Inventors: Austin L. Newman, San Jose, CA (US); Alexander J. Smith, Mountain View, CA (US)

(73) Assignee: NIO USA, Inc., San Jose, CA (US)

( * ) Notice: Subject to any disclaimer, the term of this patent is extended or adjusted under 35 U.S.C. 154(b) by 217 days.

(21) Appl. No.: 15/922,455

(22) Filed: Mar. 15, 2018

(65) Prior Publication Data

US 2019/0288254 A1     Sep. 19, 2019

(51) Int. Cl.
    *H01M 2/10*      (2006.01)
    *H01M 10/04*     (2006.01)
    *H01M 10/613*    (2014.01)

(52) U.S. Cl.
    CPC ....... *H01M 2/1083* (2013.01); *H01M 2/1077* (2013.01); *H01M 10/04* (2013.01); *H01M 10/613* (2015.04)

(58) Field of Classification Search
    CPC .. H01M 2/1077; H01M 2/1083; H01M 10/04; H01M 10/613
    USPC .......................................................... 429/99
    See application file for complete search history.

(56) References Cited

U.S. PATENT DOCUMENTS

| 4,448,863 | A | 5/1984 | Terrell |
| 5,364,203 | A | 11/1994 | Ishikawa |
| 6,381,122 | B2 | 4/2002 | Wagener |
| 6,420,655 | B1 | 7/2002 | Yang et al. |
| 6,619,005 | B1 | 9/2003 | Chen |
| 6,672,914 | B1 | 1/2004 | Claprood |

(Continued)

FOREIGN PATENT DOCUMENTS

| DE | 102010033806 | 2/2012 |
| EP | 1026770 | 8/2000 |

(Continued)

OTHER PUBLICATIONS

Official Action for U.S. Appl. No. 15/928,738, dated May 15, 2019 6 pages, Restriction Requirement.

(Continued)

*Primary Examiner* — James M Erwin
(74) *Attorney, Agent, or Firm* — Sheridan Ross P.C.

(57) ABSTRACT

An energy storage device and structurally enhanced packaging for energy storage cells is provided. The energy storage device includes a number of energy storage cells spaced apart from one another and contained in a lightweight carrier. The energy storage cells and carrier are mechanically coupled together with a structural adhesive forming a unified structure and framework where each connection point acts as a node in a force distribution structure. The structural adhesive can be injected into the volume between the energy storage cells while in a fluid, or semi-fluid, state. While in this state, a retaining form or gasket inside the carrier can prevent the structural adhesive from leaking out of the energy storage device. When in a cured, or hardened, non-fluid state the structural adhesive may adhere to the various components of the energy storage device to mechanically join the component together into a structurally safe package.

20 Claims, 10 Drawing Sheets

(56) References Cited

U.S. PATENT DOCUMENTS

| | | | |
|---|---|---|---|
| 7,007,471 | B2 | 3/2006 | Sinclair |
| 7,489,105 | B2 | 2/2009 | Weinstein et al. |
| 7,820,319 | B2 | 10/2010 | Mehta et al. |
| 8,586,226 | B2 | 11/2013 | Hashida |
| 8,893,714 | B2 | 11/2014 | Ricci et al. |
| 8,920,955 | B1 * | 12/2014 | Chuang ............... H01M 2/1077 429/7 |
| 9,160,040 | B2 | 10/2015 | Koenekamp et al. |
| 9,208,756 | B2 | 12/2015 | Isaac |
| 9,287,200 | B2 | 3/2016 | Higgins, III |
| 9,444,122 | B2 | 9/2016 | Zheng et al. |
| 9,472,794 | B1 | 10/2016 | Zakharyan et al. |
| 9,545,010 | B2 | 1/2017 | Coakley et al. |
| 9,548,476 | B2 | 1/2017 | Cicero et al. |
| 9,577,240 | B2 | 2/2017 | Choi et al. |
| 9,579,963 | B2 | 2/2017 | Landgraf |
| 2008/0272742 | A1 | 11/2008 | Hart et al. |
| 2010/0092849 | A1 | 4/2010 | Wood et al. |
| 2010/0247996 | A1 | 9/2010 | Ijaz et al. |
| 2011/0052949 | A1 | 3/2011 | Byun et al. |
| 2011/0068623 | A1 | 3/2011 | Kenington |
| 2012/0003508 | A1 | 1/2012 | Narbonne et al. |
| 2012/0100761 | A1 | 4/2012 | Große et al. |
| 2012/0121949 | A1 | 5/2012 | Eberhard et al. |
| 2013/0202928 | A1 | 8/2013 | Beulque et al. |
| 2013/0320918 | A1 | 12/2013 | Ohmer et al. |
| 2014/0113506 | A1 | 4/2014 | Jones |
| 2014/0154539 | A1 | 6/2014 | Kwok et al. |
| 2014/0234683 | A1 | 8/2014 | Sweney |
| 2014/0255750 | A1 | 9/2014 | Jan et al. |
| 2016/0020446 | A1 * | 1/2016 | Zheng ................. H01M 2/1094 429/82 |
| 2016/0093846 | A1 * | 3/2016 | Malinski ............. H01M 2/1066 429/100 |
| 2017/0018750 | A1 | 1/2017 | Wintner |
| 2017/0040646 | A1 | 2/2017 | Beaston |
| 2017/0358832 | A1 | 12/2017 | Sun et al. |

FOREIGN PATENT DOCUMENTS

| | | |
|---|---|---|
| EP | 1990849 | 11/2008 |
| EP | 2343755 | 7/2011 |
| WO | WO 2016/070801 | 5/2016 |

OTHER PUBLICATIONS

U.S. Appl. No. 15/928,780, filed Mar. 22, 2018, Newman et al.
U.S. Appl. No. 15/900,079, filed Feb. 20, 2018, Smith et al.
U.S. Appl. No. 15/928,707, filed Mar. 22, 2018, Newman et al.
U.S. Appl. No. 15/928,738, filed Mar. 22, 2018, Newman et al.
U.S. Appl. No. 15/878,312, filed Jan. 23, 2018, Newman et al.
"Heat Staking, Staking plastic using heat and pressure," Amada, 2015, retrieved from http://www.amadamiyachi.com/servlet/servlet.FileDownload?retURL=%2Fapex%2Feducationalresources_articles&file=01580000001dQXV, 2 pages.
"OPTIMA™ Batteries," Optima Batteries, Inc., 2012, 9 pages.
Notice of Allowance for U.S. Appl. No. 15/928,707, dated Feb. 6, 2020 7 pages.
Notice of Allowance for U.S. Appl. No. 15/878,312, dated Dec. 4, 2019 7 pages.
Official Action for U.S. Appl. No. 15/928,780, dated Dec. 31, 2019 10 pages.
Official Action for U.S. Appl. No. 15/900,079, dated Nov. 15, 2019 12 pages.
Official Action for U.S. Appl. No. 15/928,707, dated Oct. 3, 2019 10 pages.
Official Action for U.S. Appl. No. 15/928,738, dated Oct. 23, 2019 14 pages.
Official Action for U.S. Appl. No. 15/878,312, dated Aug. 21, 2019 12 pages.
Official Action for U.S. Appl. No. 15/928,780, dated Oct. 7, 2019 7 pages, Restriction Requirement.

* cited by examiner

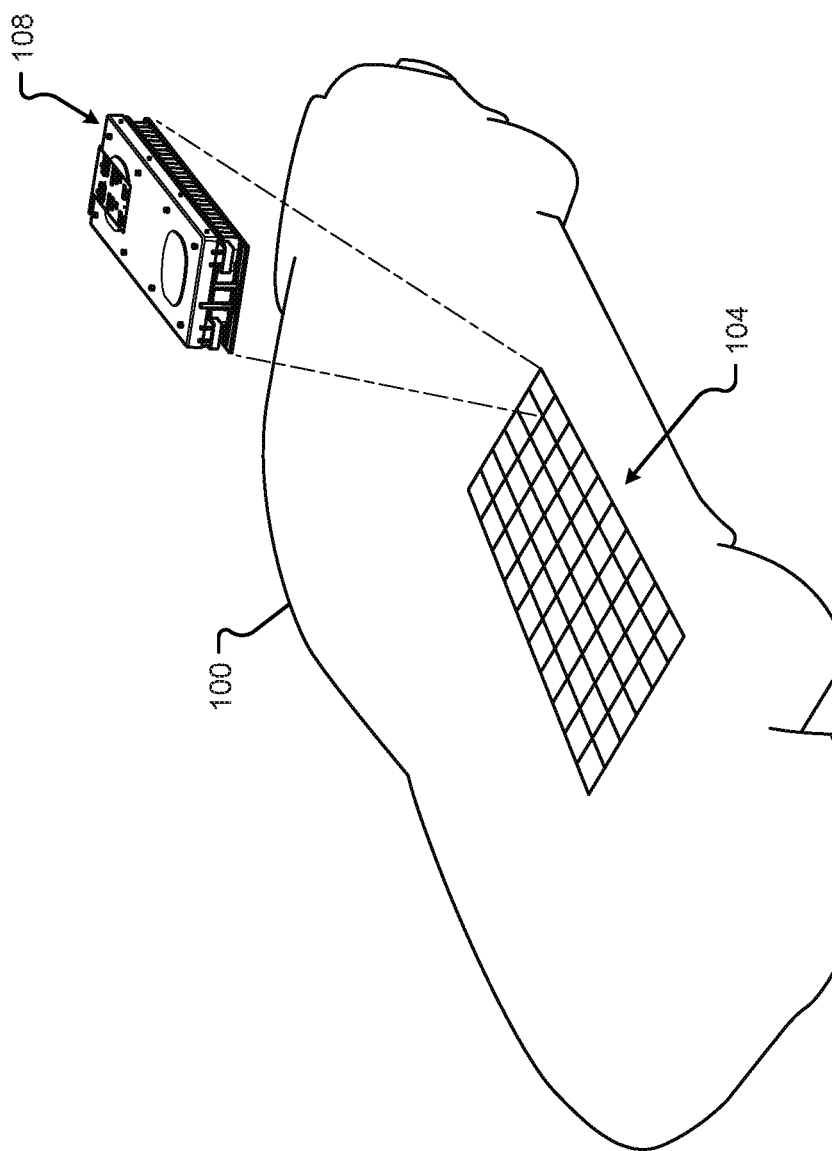

UNIFIED BATTERY MODULE WITH INTEGRATED BATTERY CELL STRUCTURAL SUPPORT

FIELD

The present disclosure is generally directed to energy storage devices, in particular, toward batteries and battery modules for electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of on board energy storage devices. These vehicle energy storage devices are generally arranged in the form of electrically interconnected individual battery modules containing a number of individual battery cells. The battery modules are generally connected to an electrical control system to provide a desired available voltage, ampere-hour, and/or other electrical characteristics to a vehicle. In some cases, one or more of the battery modules in a vehicle can be connected to a battery management system that is configured to monitor the voltage sensed from each cell in the battery module and/or the entire battery.

Electric vehicles are dependent on the integrity and reliability of the on board electrical energy power supply and energy storage devices. Typical vehicle energy storage devices include a battery that is composed of a number of battery modules and each of these battery modules may include tens, if not hundreds, of battery cells. As can be appreciated, the chance of failure in a system is proportionate to the number of components, interconnections, and connection modes, etc., in the energy storage devices of a vehicle.

BRIEF DESCRIPTION OF THE DRAWINGS

FIG. 1 shows a schematic perspective view of an electrical energy storage system in accordance with embodiments of the present disclosure;

DETAILED DESCRIPTION

Figure 2A:
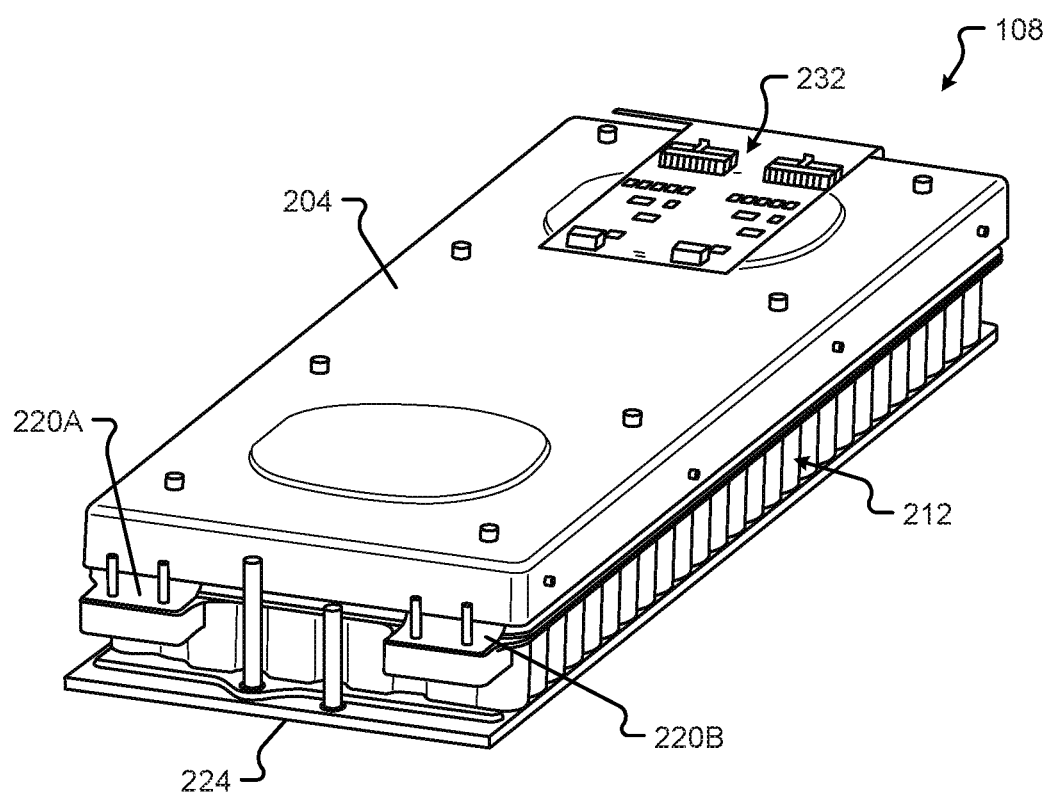
FIG. 2A shows a perspective view of a battery module in accordance with embodiments of the present disclosure.

Embodiments of the present disclosure will be described in connection with electrical energy storage devices, and in some embodiments the construction, structure, and arrangement of components making up a battery module for an electric vehicle drive system.

An electrical energy storage device for a vehicle may include at least one battery including a number of battery modules electrically interconnected with one another to provide electromotive force for the electrical drive system of a vehicle to operate. Each battery module in the at least one battery can include any number of battery cells contained and/or arranged within a battery module housing. Conventional battery module housings may include a base and a cover which are attached at a periphery of the battery module via one or more fasteners. Because these conventional housings are designed to maximize the number of battery cells contained therein, all of the fasteners and attachments are moved to an outer periphery of the housing, and the cover and base are generally made from thick plastic or metal to provide structural rigidity and integrity. As can be appreciated, these conventional housings (e.g., covers, bases, etc.) can be large, heavy, and costly. Furthermore, most battery modules include external safety structures to provide impact resistance.

Typically, the battery is also one of the largest, heaviest, and most expensive single components of an electric vehicle. As can be appreciated, any reduction in size and/or weight can have significant cost savings. The present disclosure describes a unified battery module including an integrated battery cell structural support system made up of structural foam, adhesive, and interconnecting carrier halves. In some embodiments, the present disclosure describes a method of forming a lightweight unified battery module including attaching separate battery module carrier portions together (via an adhesive flange joint) and filling a cavity inside the portions with a structural foam.

In one embodiment, the unified battery module may include a lower carrier portion and an upper carrier portion configured to surround one or more battery cells packed in a specific arrangement. The carrier portions may be temporarily joined together at a contacting flange via an adhesive and then permanently interconnected to one another via a structural foam, or other structural adhesive, injected between the battery cells and an inside of the adhesively-joined carrier portions.

Among other things, the unified battery module provides impact resistance by dissipating an impact across a structure (e.g., made up of solidified, or cured, structural foam etc.) encompassing, or at least partially surrounding, the battery cells inside the battery module. In some cases, the battery cells may behave as connection nodes, or bridges, to which the structural foam adheres and forms a protective internal structure for the battery module. The structure may be configured to flexibly move in response to an applied force or impact. This structural foam may act as a structural adhesive, thermal insulator, and even a dielectric barrier within the module. In some embodiments, the base of the module may be bonded to a cooling, or cold, plate using a structural adhesive that provides a thermal conductor (e.g., thermal interface material), and a di-electric barrier between the elements.

The upper and lower carrier portions of the battery module may be configured as thin dielectric (e.g., plastic, composite, or other electrically nonconductive or insulative material, etc.) components that house the battery cells and the structural foam. When joined together and filled with the structural foam, the carrier portions and the foam provide a lightweight battery module configured to absorb shock, impact, compression, and/or any other destructive force.

Among other things, the present disclosure describes manufacturing methods, construction, and an arrangement of components that fuse together forming a battery module. At least one benefit of the embodiments described herein is observed in the event of a crash scenario. For example, by mechanically coupling the cells together (e.g., via the structural adhesive) in the arrangement described, the load, force, or impact energy from a crash is distributed across a larger body rather than focused on a single battery cell or small group of battery cells. As can be appreciated, this distribution of forces provides a safer battery module assembly and battery for a vehicle since it is less likely that a single cell will be damaged to the extent that it would cause a thermal event or a non-passive failure in the energy storage device of the vehicle.

In some embodiments, during the assembly of a battery module, for instance, structural and/or adhesive foam may be injected from one or more sides of the battery module to provide rigidity, strength, insulation, and exact tolerance "no slop" fits between cells. At least one advantage to side-filling is that more of the structural and/or adhesive foam, while in a liquid state, is allowed to enter the battery module cavity at a faster rate (e.g., by providing an increased open space between the curved bodies of rows of battery cells, rather than via a space between only four adjacent battery cells). However, filling the battery module with foam from the side without any control structure could allow foam to cover the positive terminal, leak through openings, and otherwise disperse throughout the battery module in an uneven manner. Among other things, the present disclosure provides a control structure configured to contain foam in a particular volume of the battery module and protect portions of the battery cells and module from uncontrolled filling or leakage.

In one embodiment, the present disclosure provides a form having an array of die-cut apertures to accommodate the battery cells in the battery module. Each of the die-cut apertures may be configured to tightly fit around a battery cell (e.g., the apertures may be undersized or have a smaller diameter than a diameter of the battery cell—interference fit, be matched to the size of the battery cell diameter, and/or include a slip fit, etc.). This tight fit may prevent foam injected into the housing from extending beyond a designed level. In one embodiment, as the foam solidifies or hardens and expands, the form may be moved along an axis of the battery module a known amount.

The form may additionally contact one or more sides of the housing in a similar interference, tight, or slip fit (as described in conjunction with the apertures) providing a gasket that prevents material from pouring out of the connectors or other portions of the module. In some embodiments, the form may be made from a relatively thin amount of material (e.g., closed-cell foam, plastic, silicone, etc.).

In some embodiments, the form may be used to hold the battery cells in alignment with one another prior to filling with structural and/or adhesive foam and then may remain in place after foam has been injected.

The present disclosure describes a number of dielectric bolt compression sleeve mounts that interconnect a cover to a base of a battery module housing inside a periphery of the battery module and an area including battery cells. Among other things, moving the attachment features inside the battery cell array can provide a more rigid structure, allow for lighter materials (e.g., thinner cross-sections, composites, polymers, etc.) to be used, and allow a densely-packed battery comprising a number of battery modules in intimate or near-intimate contact with one another.

In some embodiments, the battery module may be held together via a number of dielectric compression sleeve mounts, or standoffs. Each sleeve mount may be configured as a substantially cylindrical (or other shaped) tube extending from a top of the battery module to a bottom of the battery module. In one embodiment, the sleeve mount may provide a fastener contact load surface at the top of the battery module, a compression region (e.g., along the length of the sleeve), and a mount frame contact load surface at the bottom of the battery module. The sleeve mount may be sized to provide a clamp height for the battery module such that when a fastener is inserted through the sleeve and tightened against the mount frame, a clamping force is provided holding the cover to the base of the housing, but any additional compressive force imparted by the fastener is taken up by the sleeve (preventing displacement of the cover below a predetermined height).

The sleeves may be made from Garolite G10, fiberglass, ceramic coated materials, fiberglass-epoxy laminates, etc. In one embodiment, one or more of the sleeves may be used as an assembly interface configured to interconnect with assembly equipment. For example, the sleeves may be configured to receive quick-release pins that when inserted into the sleeve compresses a ball-detent into the shaft of the pin and releases from a compressed position when the ball-detent passes through the sleeve (e.g., beyond the mount frame contact load surface). In some cases, the quick-release pins may be a part of a robot end-effector, pick-and-place, or other tool, and can be used to move or manipulate the battery module during assembly. Being disposed on the inside of the battery module periphery, the sleeves allow for closer packaging and automated assembly operations to be performed.

Not only does the bolt sleeve connect the upper and lower portions of the battery module housing, but the sleeves may act as a compression limiter, and create a dielectric barrier between the bolt and the live cell casings. The sleeves can also serve as a manufacturing aid, helping align each battery cell when building a battery module. In some embodiments, the sleeves may function as a structural anchor when structural foam and/or adhesive is added (the sleeve and plastic may be weak (e.g., in non-compression scenarios, etc.) until a major portion of the surface area of the sleeve encompassed by a filler material (e.g., the structural adhesive, etc.) creating a reinforced bar in the assembly of components.

Referring to FIG. 1, a schematic perspective view of an electrical energy storage system, or battery 104 comprising a number of electrical energy storage devices, or battery modules, 108 is shown in accordance with embodiments of the present disclosure. In one embodiment, the battery 104 may be configured to provide the electromotive force needed for the electrical drive system of a vehicle 100 to operate. Although the present disclosure recites batteries 104, battery modules 108, and/or battery cells as examples of electrical energy storage units, embodiments of the disclosure should not be so limited. For example, the battery cells 108, and/or any other energy storage device disclosed herein, may be any electrical energy storage cell including, but in no way limited to, battery cells, capacitors, ultracapacitors, supercapacitors, etc., and/or combinations thereof.

In some embodiments, the battery modules 108 may be electrically interconnected via at least one battery busbar including high voltage positive and negative terminals connected to an electrical system of the vehicle 100. The battery 104 may be configured as any number of battery modules 108 that are capable of being electrically connected together.

Figure 2B:
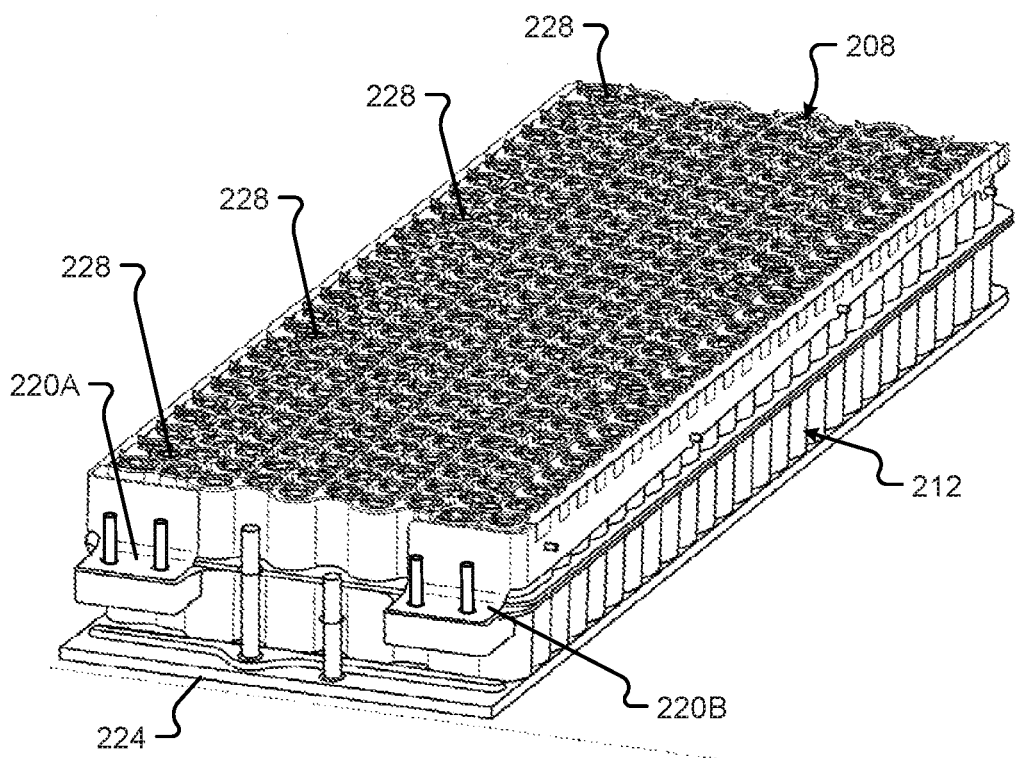
FIG. 2B shows a perspective view of the battery module of FIG. 2A with an upper shield removed.
Figure 2C:
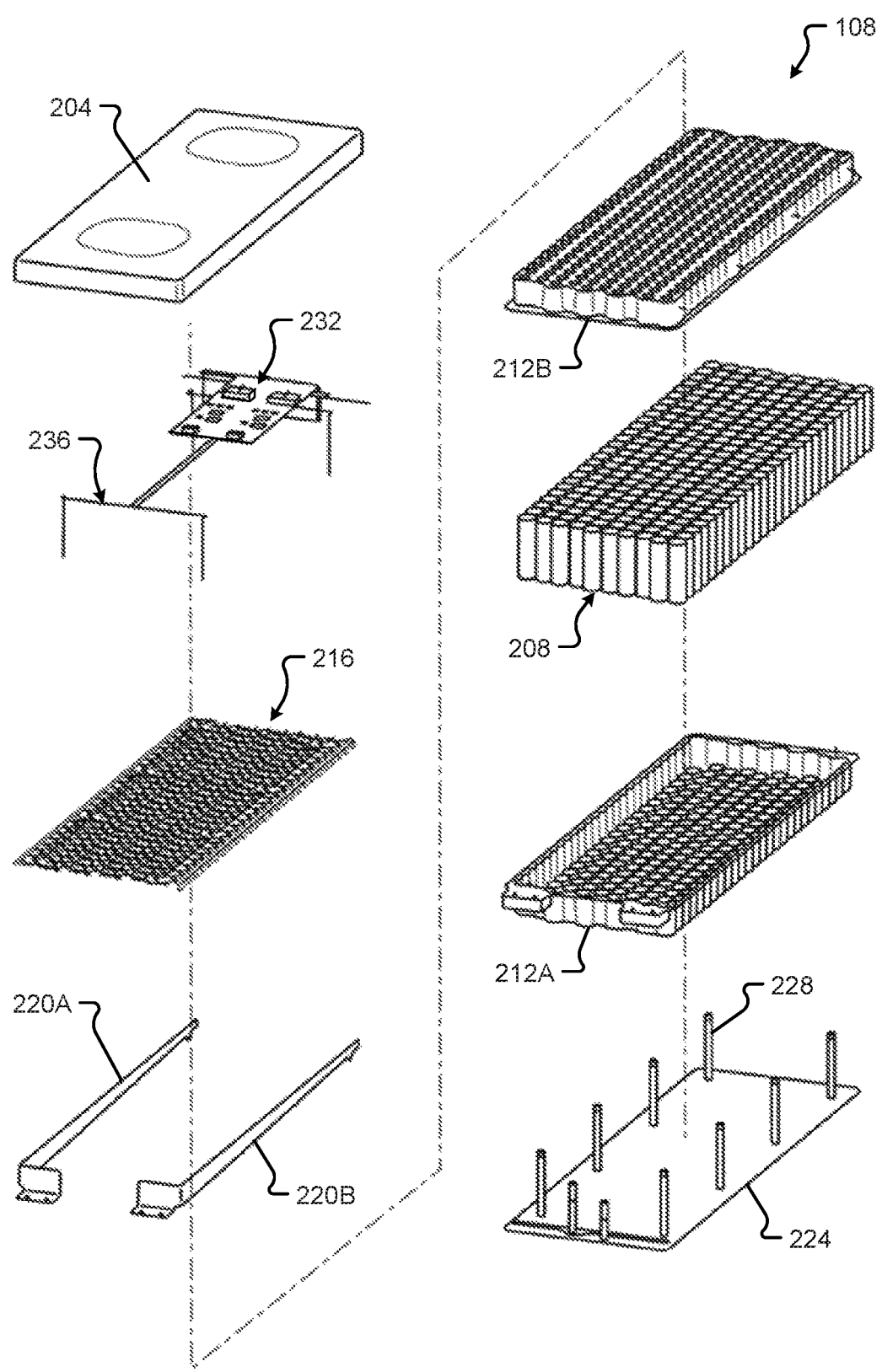
FIG. 2C shows a perspective exploded view of the battery module of FIG. 2A.

FIGS. 2A-2C show various perspective views of a battery module 108 in accordance with embodiments of the present disclosure. The battery module 108 may comprise an upper shield 204, a plurality of battery cells 208, a housing or carrier 212 configured to contain the battery cells 208, battery cell interconnects 216, first and second battery module busbars 220A, 220B, a cooling plate 224, and one or more mount sleeves 228. In some embodiments, the battery module 108 may include a battery management system 232 and sensing system 236.

FIG. 2A shows a perspective view of a battery module 108 in accordance with embodiments of the present disclosure. The battery module 108 shown in FIG. 2A includes an upper shield 204 configured to substantially cover the battery cell interconnects 216, battery cells 208, and other electrical connections (e.g., first and second battery module busbars 220A, 220B, etc.). In some embodiments, the upper shield 204 may correspond to a drip shield. In any event, the upper shield 204 may be made from molded, formed, or otherwise shaped plastic, dielectric, or nonconductive material. In one embodiment, the battery management system (BMS) 232 electronics (e.g., printed circuit board, chips, etc.) may be mounted to an exterior or interior surface of the upper shield 204. As shown in FIG. 2A, the BMS 232 and corresponding electronics are mounted to an exterior surface (e.g., a surface separate and spaced apart from the battery cells 208 and battery cell interconnects 216, etc.).

FIG. 2B shows a perspective view of the battery module 108 of FIG. 2A with the upper shield 204, BMS 232, and other electronics removed for the sake of clarity. As shown in FIG. 2B, the first and second battery module busbars 220A, 220B extend from a high voltage connection end, including two connection standoffs per busbar 220A, 220B, along the length of the battery module 108 to the opposite end of the battery module 108.

In FIG. 2C, the housing 212 is shown having a lower housing 212A and an upper housing, or cover, 212B. In some embodiments, the lower housing 212A and cover 212B may be interconnected with one another to form the complete housing 212. As shown in FIG. 2C, the lower housing 212A and/or the cover 212B may be configured to at least partially contain a number of battery cells 208. For instance, both the lower housing 212A and the cover 212B include a number of surfaces and walls defining battery cell 208 containment cavities including volumes for receiving the battery cells 208. Both the lower housing 212A and cover 212B may include a number of receptacles sized to receive and arrange each of the battery cells 208 relative to one another. In one embodiment, the lower housing 212A and cover 212B may include receptacles, or apertures, configured to receive one or more fasteners and mount sleeves 228.

Figure 3:
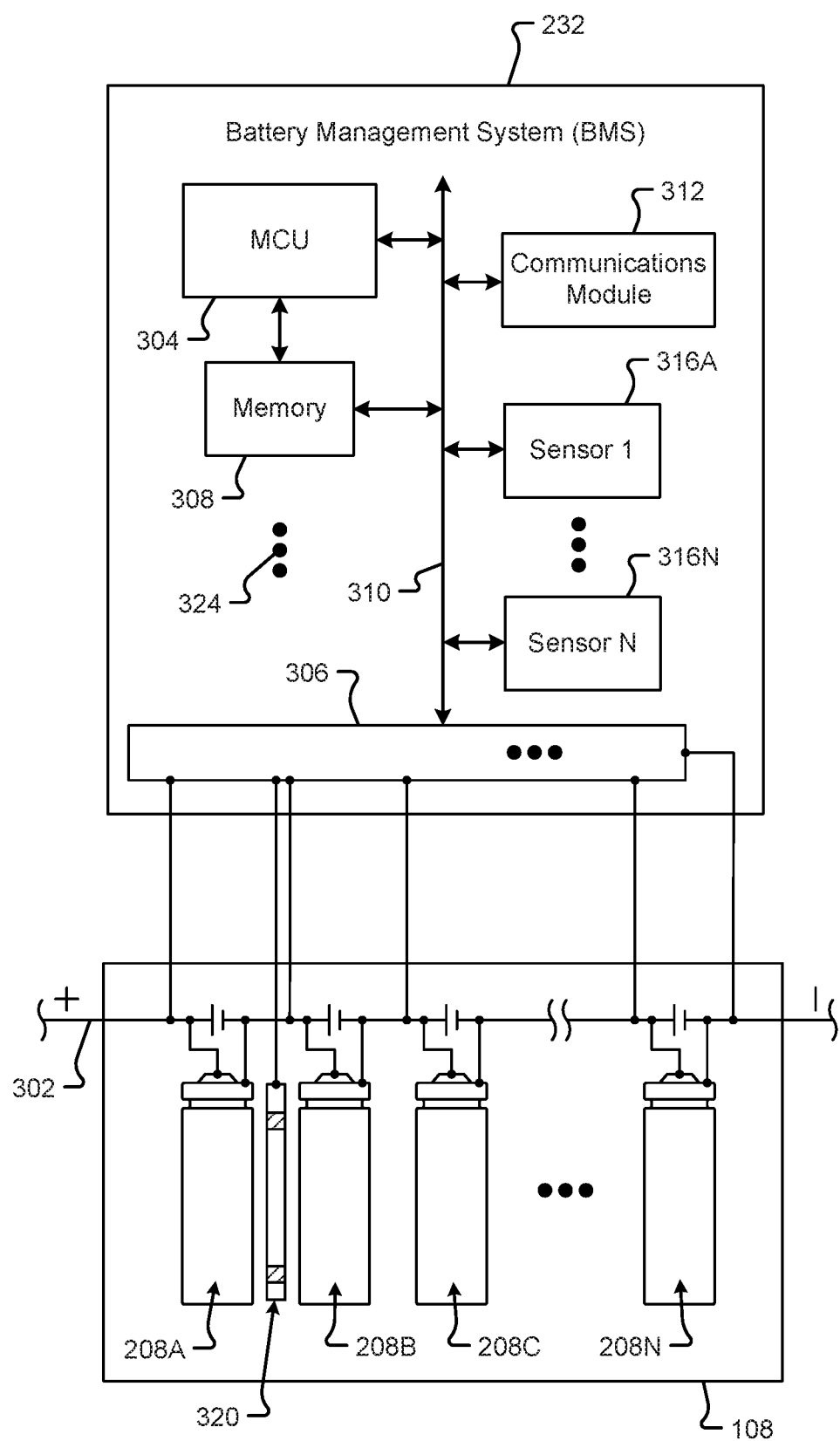
FIG. 3 shows a schematic block diagram of the battery management system in accordance with embodiments of the present disclosure.

FIG. 3 shows a schematic block diagram of the BMS 232 interconnected with the battery module 108 in accordance with embodiments of the present disclosure. In some embodiments, each battery module 108 of a battery 104 may include a corresponding unique BMS 232. In other embodiments, the multi-module battery 104 comprising a number of battery modules 108 may be monitored and/or controlled by a single multi-module BMS.

The BMS 232 may include a bus 306 including a number of terminals configured to interconnect with electrical lines 302 interconnected with the battery cells 208 of the battery module 108. In some embodiments, the interconnection between the battery module 108 and the BMS 232 may be via a physical electrical connector disposed on the battery module 108, the BMS 232, and/or both the battery module 108 and the BMS 232. The BMS 232 may be configured to monitor and/or control a state of charge associated with each battery cell 208A-N in the battery module 108. In some embodiments, the BMS 232 may include a microcontroller unit (MCU) 304, including one or more processors, interconnected with a memory 308 via at least one connection, or communications bus 310. The memory 308 may be one or more disk drives, optical storage devices, solid-state storage devices such as a random access memory (RAM) and/or a read-only memory (ROM), which can be programmable, flash-updateable and/or the like. Additionally or alternatively, the BMS 232 may include a communications module 312, one or more sensors 316A-N, and/or other components 324 interconnected with the communication bus 310, charger (not shown), and/or other systems in an electric power distribution system (not shown). The communications module 312 may include a modem, a network card (wireless or wired), an infra-red communication device, etc. and may permit data to be exchanged with a network and/or any other charger or processor in the electric power distribution system as described.

In any event, pairs of electrical interconnections may provide voltages from the battery module 108 to the MCU 304 of the BMS 232 and these voltages may be used to determine a state (e.g., voltage, current, state of charge, etc.) associated with a particular battery cell 208A-N in the battery module 108.

Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

In one embodiment, the sensors 316A-N may include one or more temperature sensors, thermocouples, pressure sensors, etc. The sensors 316A-N may be disposed between, adjacent to, spaced apart from, and/or in contact with, one or more of the battery cells 208A-N. As shown in FIG. 3, a multiple-zone thermocouple 320 is disposed between adjacent battery cells 208A, 208B in the battery module 108. The multiple-zone thermocouple 320 may include a housing having a first temperature sensing region disposed adjacent to a lower portion (e.g., bottom) of the battery cells 208 and a second temperature sensing region disposed adjacent to an upper portion (e.g., top) of the battery cells 208. The first temperature sensing region of the multiple-zone thermocouple 320 may correspond to a junction where two dissimilar metals of the thermocouple 320 are joined together and the other ends of the two dissimilar metals are attached to the BMS 232, and more specifically, the sensor (e.g., sensors 316A-N) configured to measure a voltage change at the junction when temperature changes. Similarly, the second temperature sensing region of the multiple-zone thermocouple 320 may correspond to a junction where a different set of two dissimilar metals of the thermocouple 320 are joined together and the other ends of the different set of two dissimilar metals are attached to the BMS 232, and more specifically, the sensor (e.g., sensors 316A-N) configured to measure a voltage change at the junction when temperature changes. This multiple-zone thermocouple 320 may allow the BMS 232 to determine, via the corresponding one or more sensors 316A-N, a temperature at the bottom and the top of groups of battery cells 208 using a single thermocouple housing or inserted device.

Figure 4A:
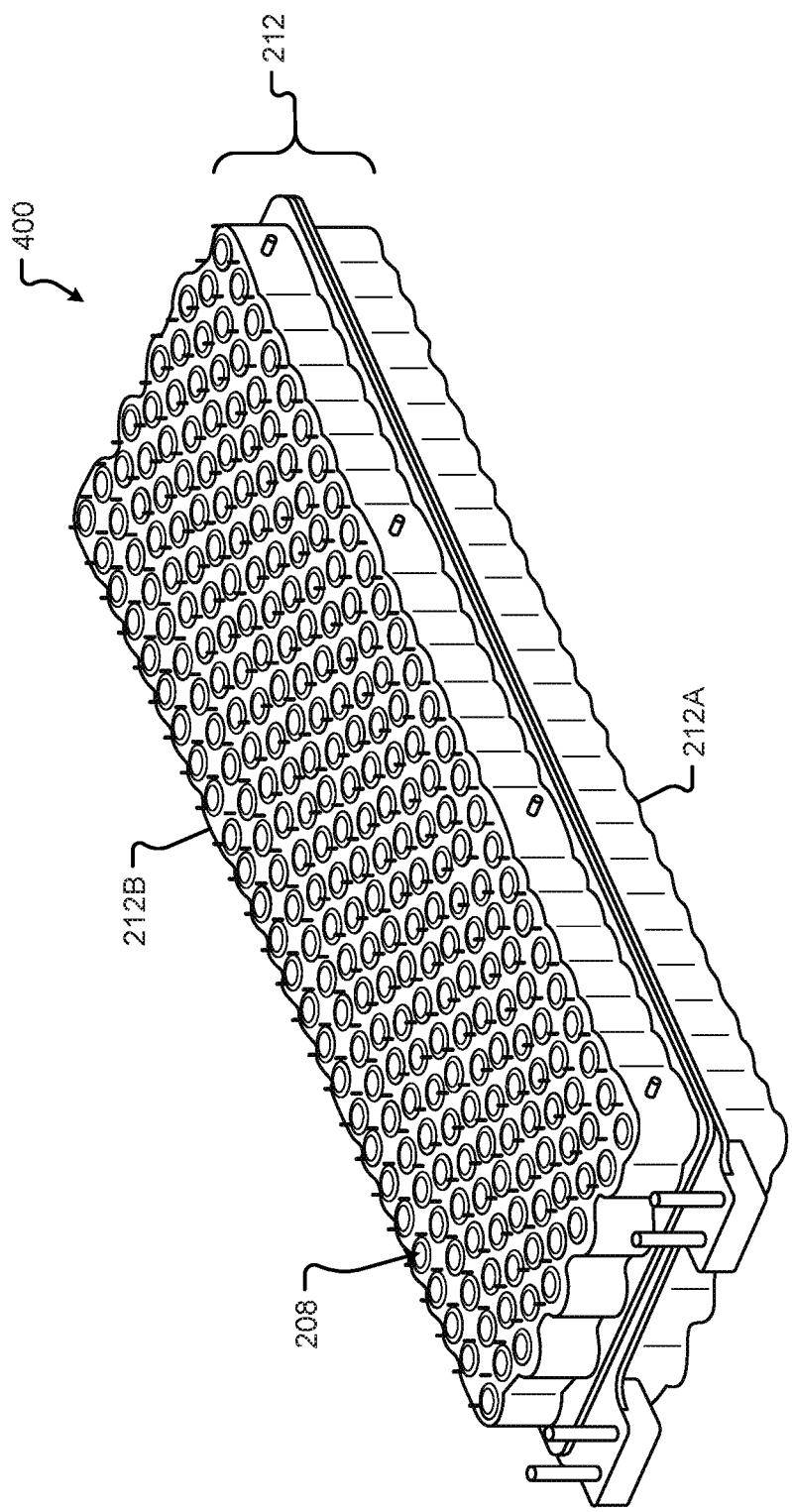
FIG. 4A shows a perspective view of the joined housing and cells forming the integrated battery cell structural support for the battery module in accordance with embodiments of the present disclosure.
Figure 4B:
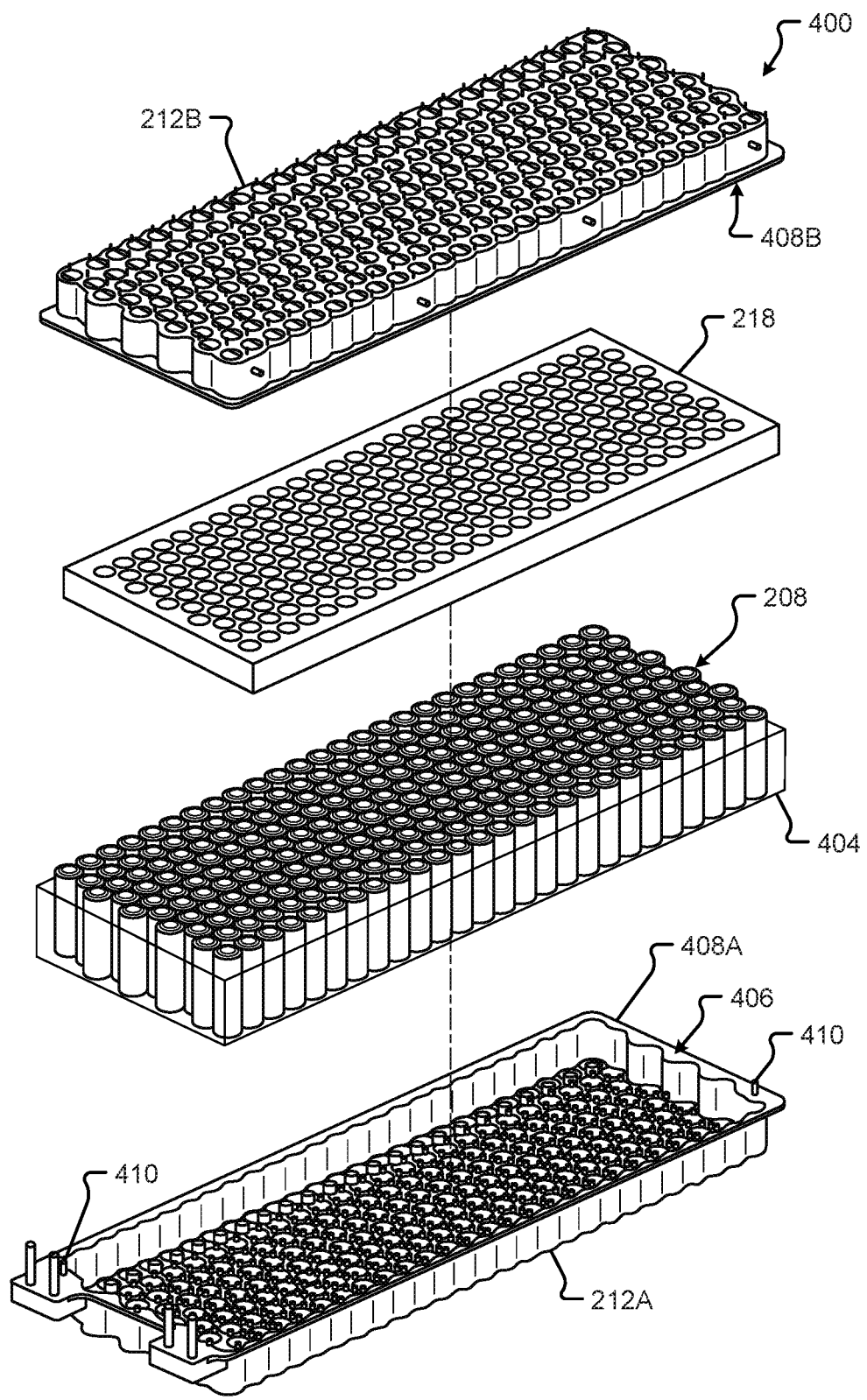
FIG. 4B shows an exploded perspective view of the battery module integrated battery cell structural support of FIG. 4A.

FIGS. 4A and 4B show various perspective views of the integrated battery cell structural support 400 for the battery module 108. The integrated battery cell structural support 400 may at least comprise the lower housing 212A, the battery cells 208, the cover 212, and a structural adhesive 404 disposed between adjacent battery cells 208 as well as between the battery cells 208 and the lower housing 212A and cover 212B. During assembly, the structural adhesive 404 may be configured to flow into the spaces between spaced-apart adjacent battery cells 208 and other areas around the battery cells 208 and inside the housing 212. Once cured, or hardened, the structural adhesive 404 may adhere to and connect the battery cells 208 forming a unified structure configured to resist forces and absorb impact or shock through a network of connected nodes in the battery module 108. Additionally or alternatively, the structural adhesive 404 may adhere to and connect the battery cells 208 to the various portions of the housing 212 (e.g., lower housing 212A, cover 212B, etc.) and/or other components of the battery module 108 (e.g., the one or more mount sleeves 228, battery cell retaining form, and/or gasket, 218, etc.). The structural adhesive 404 may correspond to the structural foam that acts as a structural adhesive, thermal insulator, and even a dielectric barrier within the battery module 108.

In some embodiments, the integrated battery cell structural support 400 may include a battery cell retaining form 218. The battery cell retaining form 218 may be configured as a die cut or formed block of material (e.g., foam, lightweight plastic, etc.) including a number of receptacles formed therethrough. These receptacles may be sized to receive at least a portion of the array of battery cells 208 and the form 218 may be configured to act as a gasket (e.g., preventing the structural adhesive 404 from expanding through the array of receptacles as the structural adhesive cures in the housing 212).

Referring to FIG. 4A, a perspective view of the joined housing 212 and battery cells 208 forming the integrated battery cell structural support 400 for the battery module 108 is shown in accordance with embodiments of the present disclosure. When joined together, the housing 212, the battery cells 208, and the structural adhesive 404 form a unified structural force distribution system allowing the entire system of interconnected elements to move upon receiving a force or impact.

FIG. 4B shows an exploded perspective view of the battery module integrated battery cell structural support 400 of FIG. 4A. As shown in FIG. 4B, the battery cell retaining form 218 may be disposed at, or adjacent to, an upper portion of the battery cells 208. Among other things, this arrangement of the battery cell retaining form 218 provides a seal, or gasket, between the structural adhesive 404 and the battery cell electrical interconnections 216 (e.g., shown in FIGS. 2B and 2C), preventing uncured and/or cured structural adhesive 404 from reaching these sensitive electrical areas. Although shown in FIG. 4B as an element surrounding the battery cells 208, it should be appreciated that the structural adhesive 404 may be inserted into the spaces surrounding the battery cells 208 while inside the housing 212 in an assembled, or connected, state. The structural adhesive 404 may be inserted or deposited into these spaces while in a fluid, or semi-fluid state, and when cured, the structural adhesive 404 may mechanically connect the elements that are in contact with the structural adhesive 404 (e.g., the battery cells 208, lower housing 212A, the cover 212B, and any other elements, e.g., optionally the battery cell retaining form 218, etc.).

In some embodiments, the lower housing 212A and the cover 212B may be attached together, at least temporarily, via a flanged connection 408A, 408B. For instance, the lower housing 212A may include a flange, or flanged surface, 408A that mates with a mating flanged surface of the cover 212B (e.g., via an adhesive, fastener, connection, tab-and-slot, clip, or other connective interface, etc.). The flanged surface 408A may follow at least a portion of the periphery of the lower housing 212A. The flanged surface 408A may be offset from and substantially parallel to a base, or planar surface, of the lower housing 212A. In one embodiment, the flanged surface 408A may extend outwardly from the walls of the lower housing 212A. The cover 212B may include a similar mating flange, or mating flanged surface, 408B that follows at least a portion of the periphery of the cover 212B and/or the lower 212A. The mating flanged surface 408B of the cover 212B may be offset from and substantially parallel to a planar surface, of the cover 212B. In one embodiment, the mating flanged surface 408B may extend outwardly from the walls of the cover 212B.

It is an aspect of the present disclosure that the flanged surface 408A and/or the mating flanged surface 408B may include an adhesive layer 406 deposited thereon. The adhesive layer 406 may correspond to an adhesive material, double-sided adhesive tape, and/or the like. In any event, the adhesive layer 406 may attach the lower housing 212A to the cover 212B, and more specifically, connect the flanged surface 408A to the mating flanged surface 408B. In one embodiment, the flanged surface 408A and/or the mating flanged surface 408B may include at least one connecting element 410 (e.g., fastener, standoff, post, tab-and-slot, clip, or other connective interface, etc.) that is configured to mate, or interconnect, with a corresponding feature on the other of the flanged surface 408A and/or the mating flanged surface 408B.

Figure 5A:
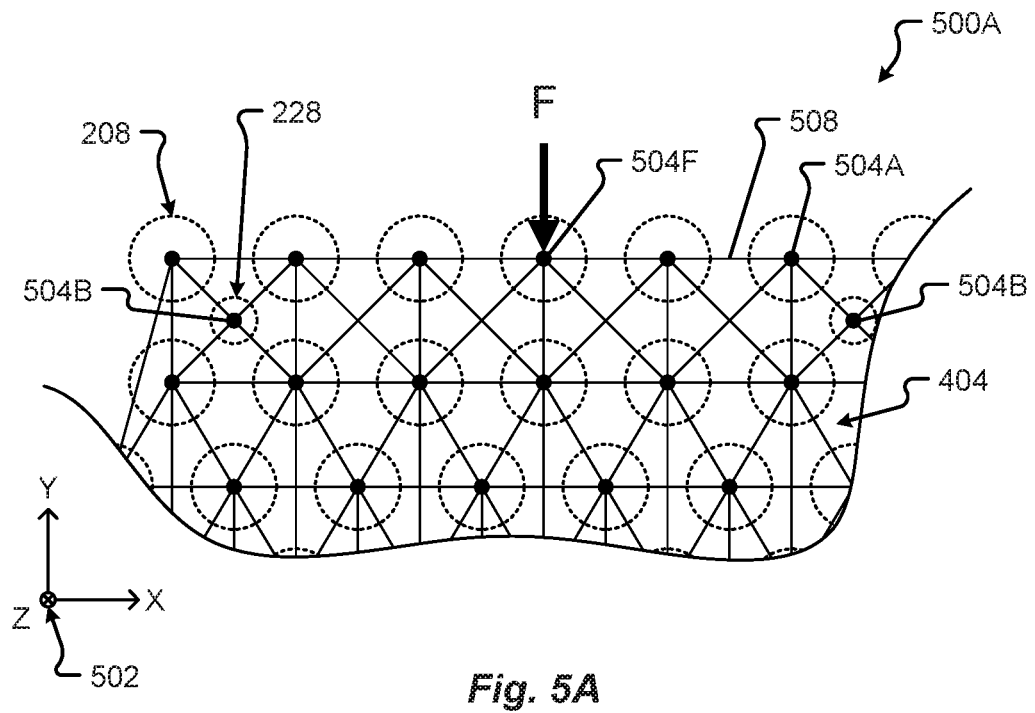
FIG. 5A shows a schematic representation of a force distribution framework of the battery module in a first state in accordance with embodiments of the present disclosure.
Figure 5B:
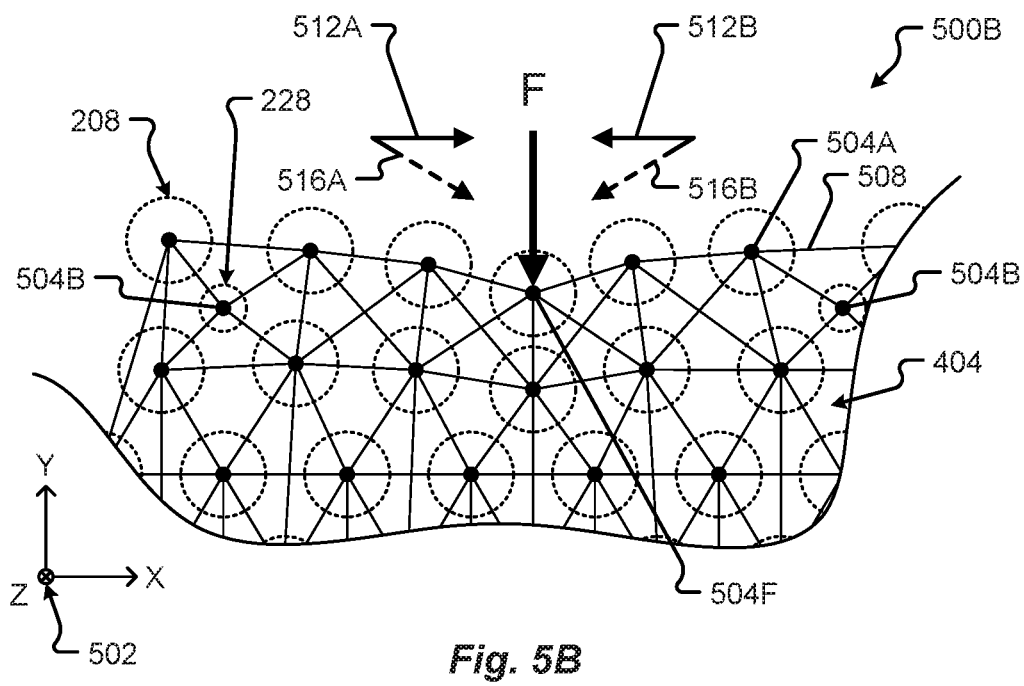
FIG. 5B shows a schematic representation of a force distribution framework of the battery module in a second state in accordance with embodiments of the present disclosure.

FIGS. 5A and 5B show schematic representations of a force distribution framework associated with the unified battery module 108 with integrated battery cell structural support at different impact states 500A, 500B in accordance with embodiments of the present disclosure. The force distribution framework shows a number of nodes 504A, 504B (e.g., representing battery cells 208 and mount sleeves 228, respectively, in the battery module 108, etc.) connected to one another via a number of connectors 508 (e.g., representing the structural adhesive 404). Although represented as a simplified number of nodes 504A, 504B, 504F and connectors 508 in FIGS. 5A and 5B, it should be appreciated that additional nodes may correspond to the edges and surfaces of the housing 212, the battery cell retaining form 218, the cooling plate 224, and/or other components making up the battery module 108. It should further be appreciated that additional connectors may exist between the surfaces of the components making up these additional nodes as well as the nodes 504A, 504B, 504F not shown. However, for the sake of clarity in disclosure, the nodes 504A, 504B, 504F and connectors 508 shown have been represented in a simplified and schematic form. In some embodiments, the first nodes 504A may represent battery cells 208 that are held in position (e.g., in the X-Y plane of the representative coordinate system 502) at least via a lower housing 212A and a cover 212B. In one embodiment, it is an aspect of the present disclosure that the first nodes 504A may additionally be held in position (e.g., in the X-Y plane) via a battery cell retaining form 218.

FIG. 5A shows a schematic representation of a force distribution framework associated with the unified battery module 108 with integrated battery cell structural support at a pre-impact state 500A. As shown, in FIG. 5A a force, F, is about to act on a node 504F in the force distribution framework. This force, F, may represent an impact (e.g., from a collision, component shift, or other mechanical failure, etc.) in the form of a vector having a first magnitude and acting in the negative Y-direction (e.g., according to the representative coordinate system 502 shown). At this pre-impact state 500A, the nodes 504A, 504B, 504F of the framework are all maintained at relative distances to one another by the components of the battery module 108 and the structural adhesive 404 disposed therebetween.

As the force, F, contacts the node 504F in the force distribution framework, FIG. 5B shows the force, F, displacing the node 504F a specific distance in the negative Y-direction (e.g., pushing the node 504F closer to the next adjacent node 504A along the Y-axis, etc.) and the framework of nodes 504A, 504B, 504F and connectors 508 working in concert to resist the displacement imparted by the force, F. In particular, as the node 504F is displaced, the structural adhesive 404 under the node 504F acts in compression, while portions of the structural adhesive 404 between immediately adjacent nodes 504A along the X-axis to the Y-axis displacing node 504F may act in tension. For example, the immediately adjacent nodes 504A along the X-axis are brought closer to the Y-axis displacing node 504F in directions 512A, 512B (e.g., via a tension in the structural adhesive 404 between the immediately adjacent nodes 504A along the X-axis and the displacing node 504F). This tension may move the immediately adjacent nodes 504A in a resultant direction 516A, 516B (e.g., based on the X-axis directions 512A, 512B and the Y-axis displacement direction). In some embodiments, the force, F, may additionally cause the structural adhesive 404 to act in compression forcing the next adjacent nodes 504A along the Y-axis into a Y-axis displaced state. In any event, the structural adhesive 404 may be configured to provide a variable resistance as it is compressed and/or drawn out (e.g., stretched under tension). In some embodiments, all of the nodes and connectors in the battery module 108 force distribution framework may experience some movement (e.g., displacement) and/or absorb at least some of the force from the force, F. Distributing the impact force, F, among a large number, if not all, of the nodes 504A, 504B, 504F in the framework allows the battery module 108 to decrease a force observed at a point of contact (e.g., node 504F) while continuing to remain flexible in the X-Y plane.

Figure 6:
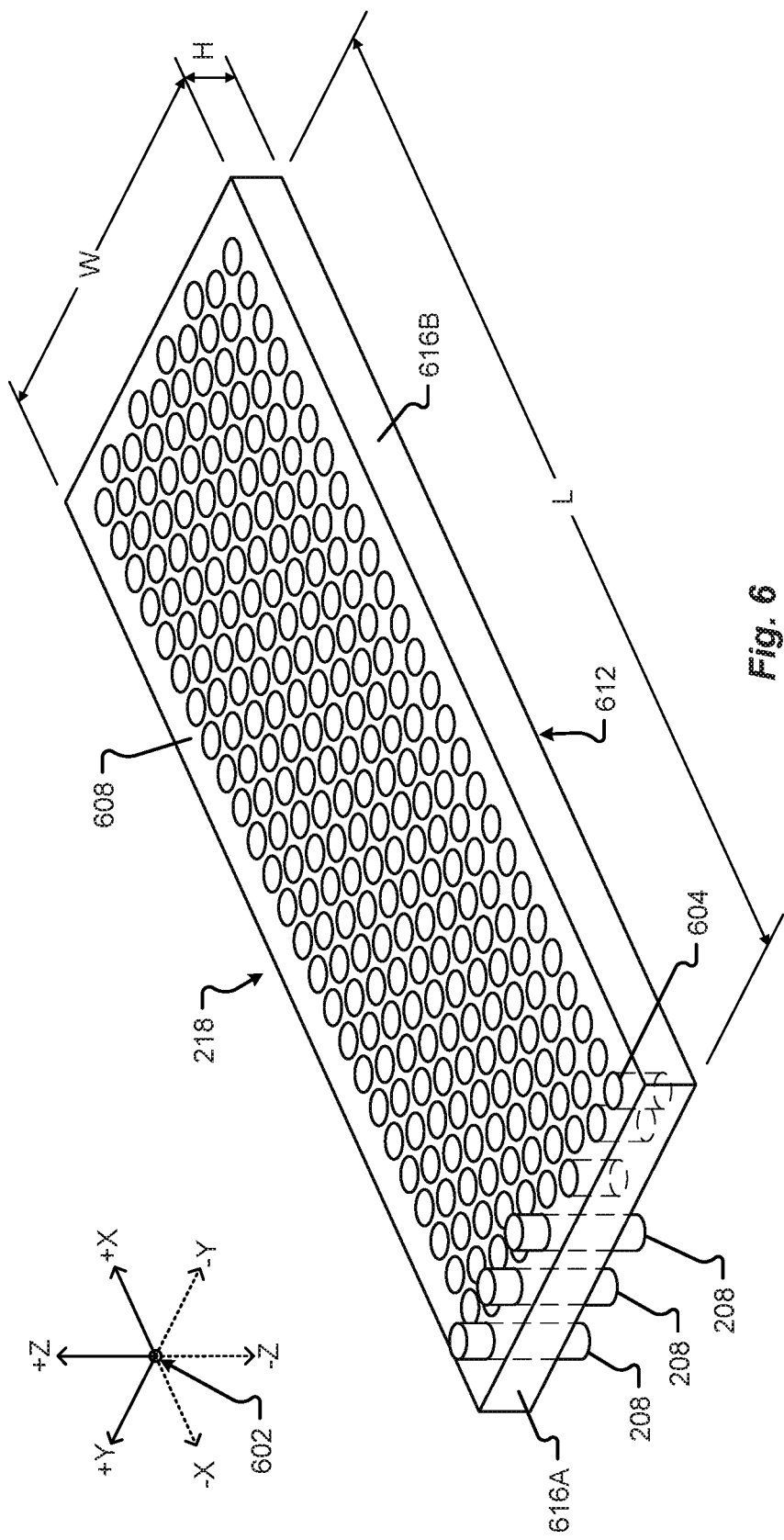
FIG. 6 shows a perspective view of a battery cell retaining form and/or gasket in accordance with embodiments of the present disclosure.

FIG. 6 shows a perspective view of the battery cell retaining form 218 with several battery cells 208 disposed therein in accordance with embodiments of the present disclosure. In some embodiments, the battery cell retaining form 218 may comprise substantially planar first surface 608 offset, a height, H, from a substantially planar second surface 612. The battery cell retaining form 218 may include a number of sides 616A-D (sides 616C and 616D not shown), or sidewalls, disposed around a periphery of the form 218. The battery cell retaining form 218 may include an array of receptacles 604 formed through the first and second surfaces. In one embodiment, the array of receptacles 604 may be arranged, or formed, in the battery cell retaining form 218 in a battery cell distribution pattern. In some embodiments, the array of receptacles 604 formed in the battery cell retaining form 218 are sized to prevent uncured and/or cured structural adhesive 404 from expanding through the array of receptacles (e.g., as the structural adhesive cures in the housing 212), the structural adhesive 404 further mechanically joining the battery cell retaining form 218 as part of the unified and integral structure of the battery module 108.

Although shown as a substantially rectangular solid material, it should be appreciated that the battery cell retaining form 218 may be of any solid shape substantially conforming to an arrangement of the battery cells 208 in the housing 212 of the battery module 108. In any event, the battery cell retaining form 218 may include a length, L, extending from a first side 616A, along a second side 616B, to a third side 616C (not shown) (e.g., in the positive X-axis direction according to the representative coordinate system 602 shown) and a width, W, extending from the second side 616B along the first side 616A, to a fourth side 616D (not shown) (e.g., in the positive Y-axis direction according to the representative coordinate system 602 shown). In some embodiments, the height, H, may correspond to a distance measured between the first surface 608 and the opposing second surface 612 in the Z-axis direction. In one embodiment, the length, L, width, W, and height, H, may define a volume of the battery cell retaining form 218. The volume of the battery cell retaining form 218 may be sized to fit within at least one containment cavity of the housing 212 (e.g., lower housing 212A, cover 212B, and/or combinations thereof).

In some embodiments, the battery cell retaining form 218 may be made from a foam, plastic, or other lightweight dielectric material (e.g., low-density rigid foam, closed-cell foam, open-cell foam, molded plastic, composites, etc.). The receptacles 604 may be die cut, wire electrical discharge machined (EDM) cut, machined, molded, or otherwise formed through the battery cell retaining form 218. It is an aspect of the present disclosure that the number of receptacles 604, or battery receiving features, in the battery cell retaining form 218 match the number of battery cells 208 in the battery module 108.

Figure 7A:
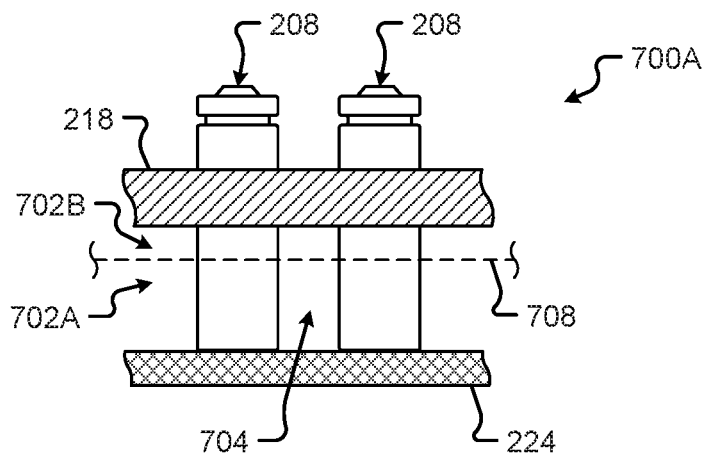
FIG. 7A shows a battery cell retaining form and/or gasket in a first assembly state in accordance with embodiments of the present disclosure.
Figure 7B:
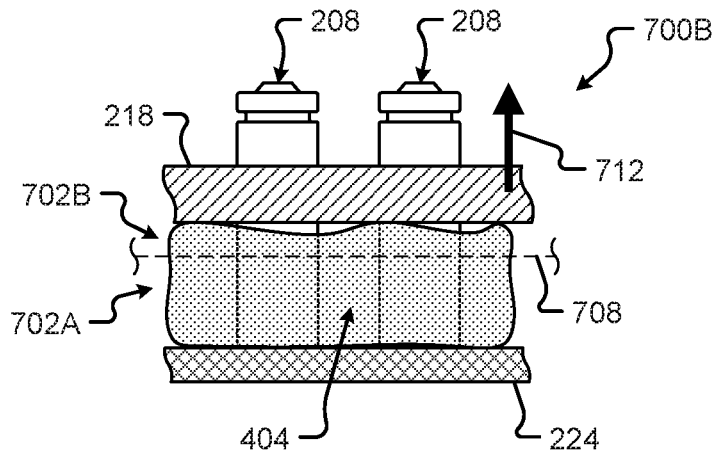
FIG. 7B shows a battery cell retaining form and/or gasket in a second assembly state in accordance with embodiments of the present disclosure.
Figure 7C:
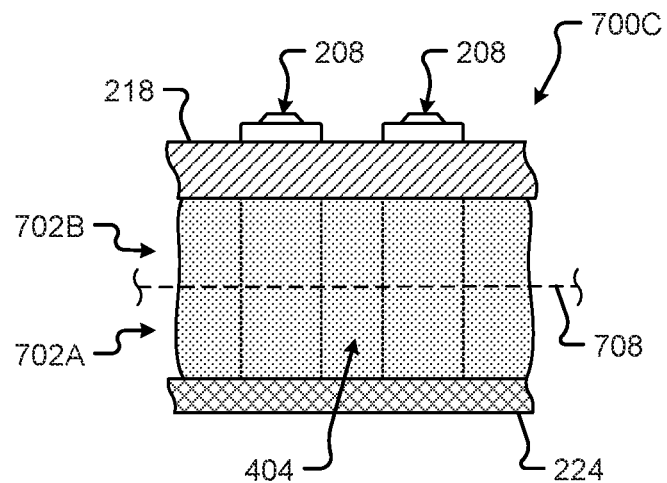
FIG. 7C shows a battery cell retaining form and/or gasket in a third assembly state in accordance with embodiments of the present disclosure.

Referring now to FIGS. 7A-7C, a detail broken section view of adjacent battery cells 208 held in the receptacles 604 of a battery cell retaining form 218 disposed inside a battery module 108 is shown at various stages 700A-C of assembly in accordance with embodiments of the present disclosure. The battery cells 208 are shown held in place, at least partially, via the battery cell retaining form 218. In some embodiments, a surface of each battery cell 208 (e.g., the bottom) may be placed into contact with a cooling plate 224. The cooling plate 224 may be configured to convey a coolant or other fluid therethrough, thereby cooling at least one surface of the cooling plate and objects (e.g., battery cells 208, etc.) in contact with the at least one surface. In one embodiment, the battery cells 208 may be mechanically adhered to the cooling plate 224 via a thermally conductive adhesive material. In some embodiments, the thermally conductive adhesive material may include mechanical separation elements embedded therein (e.g., beads, etc.), configured to separate the lowest surface of the battery cells 208 from the cooling plate 224 surface a known distance. Among other things, this separation may provide a predictable thermal conductive path between the cooling plate 224 and the battery cells 208 via the thermally conductive adhesive material. As described above, the base of the module 108, the carrier 212, and/or one or more battery cells 208 may be bonded to the cooling plate 224 using a structural adhesive that provides a thermal conductor (e.g., thermal interface material), and a di-electric barrier between the various elements and the cooling plate 224.

The detail broken section view shows a split line 708 representing the lines where a lower housing 212A may meet, or otherwise interconnect, with a cover 212B. As can be appreciated, the split line 708 delineates between the first containment cavity space 702A (e.g., of the lower housing 212A) and the second containment cavity space 702B (e.g., of the cover 212B) of the housing 212. A filling space, or volume, 704 disposed between adjacent battery cells 208 is shown in FIG. 7A. In some embodiments, the structural adhesive 404 may be deposited (e.g., in a fluid, or semi-fluid state) into this filling volume 704 such that the structural adhesive 404 may evenly distribute and disperse between all of the battery cells 208 in the battery module 108.

FIG. 7A shows a battery cell retaining form 218 in a first assembly state 700A (e.g., the pre-fill stage) in accordance with embodiments of the present disclosure. In FIG. 7A, the battery cell retaining form 218 has been disposed toward an upper portion (e.g., the positive terminal end) of the battery cells 208. In some embodiments, the battery cell retaining form 218 may be contained inside the first containment cavity space 702A prior to filling with structural adhesive 404. In one embodiment, the battery cell retaining form 218 may be biased to be adjacent to the split line 708 of the housing 212 prior to filling the battery module 108 and the filling volume 704 with structural adhesive 404.

In some embodiments, the structural adhesive 404 may be inserted into the filling volume 704 in a volume at least partially enclosed by an attached lower housing 212A and cover 212B. The lower housing 212A and the cover 212B may be attached via an adhesive connection, or adhesive layer 406, disposed on the flanged surface 408A and/or the mating flanged surface 408B. In some cases, this structural adhesive 404 may remain in place after the filling volume 704 is filled mechanically connecting the lower housing 212A to the cover 212B.

FIG. 7B shows the battery cell retaining form 218 in a second assembly state 700B (e.g., the initial fill stage) in accordance with embodiments of the present disclosure. As the structural adhesive 404 is inserted, pumped, or otherwise deposited into the filling volume 704 between the battery cells 208, the hydraulic force of the material filling and/or expanding in the first containment cavity space 702A may force the battery cell retaining form 218 in an upward direction 712 toward the upper portion of the battery cells 208.

FIG. 7C shows the battery cell retaining form 218 in a third assembly state 700C (e.g., the fill-cured stage) in accordance with embodiments of the present disclosure. Once the appropriate amount of structural adhesive 404 is inserted into the filling volume 704 (e.g., based on a volumetric dispense, mass dispense, etc., and/or combinations thereof, the battery cell retaining form 218 will cease to displace, or move, in the upward direction 712. In some embodiments, the battery cell retaining form 218 may provide a space between the uppermost surface of the form 218 and the upper end, or top, of the battery cell 208. This space may provide working area for making electrical interconnections, inserting other materials, and/or the like. In some embodiments, the battery cell retaining form 218 may compress between the cured structural adhesive 404 and the inside planar surface of the cover 212B. In this example, the substantially planar first surface 608 of the form 218 may contact the inside upper surface of the cover 212B, while the substantially planar second surface 612 of the form 218 may contact the structural adhesive 404. This compression of the form 218 may allow for a tolerance in expansion of the structural adhesive 404 when curing. For instance, if the structural adhesive 404 has an estimated expansion volume of 20% greater than the original amount of fluid +/−5%, the battery cell retaining form 218 may be configured to compress an amount to accommodate the +5% expansion, +10% expansion, and/or more. In any event, once the structural adhesive 404 cures, and hardens into a solid or semi-solid state, the battery cells 208, the cold plate 224, and the battery cell retaining form 218 are joined together by the structural adhesive 404, forming an integral and unified battery module 108 assembly.

Figure 8A:
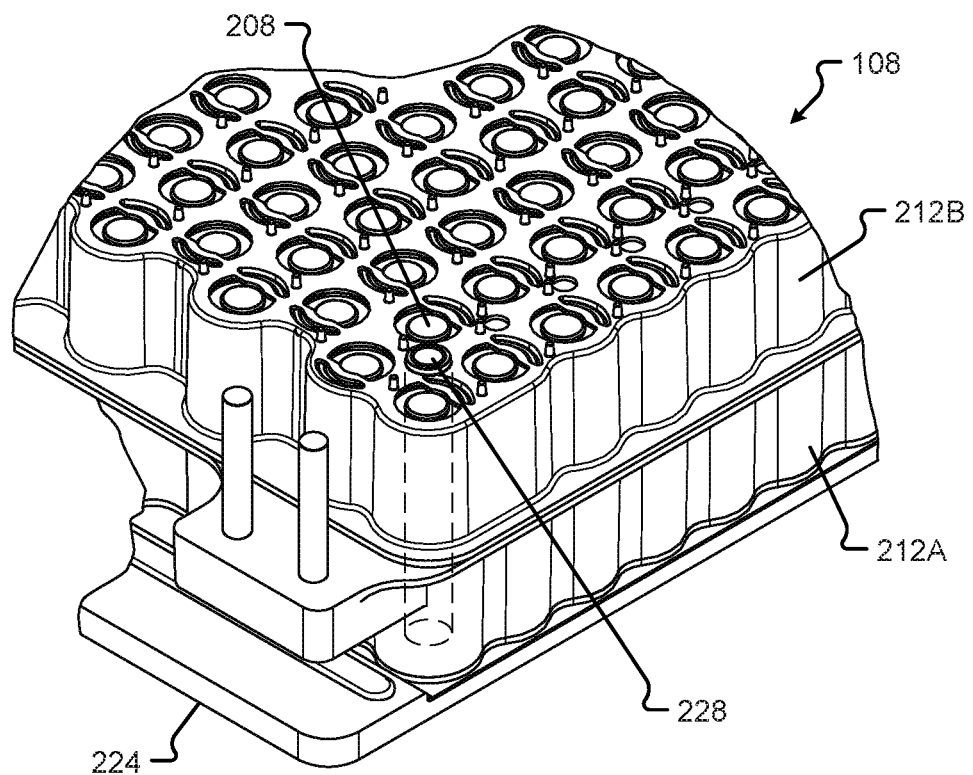
FIG. 8A shows a perspective view of a dielectric mount sleeve disposed between battery cells in a battery module in accordance with embodiments of the present disclosure.

FIG. 8A shows a perspective view of a dielectric mount sleeve 228 disposed between adjacent battery cells 208 in a battery module 108 in accordance with embodiments of the present disclosure. As shown in FIG. 8A, the upper shield 204, fastener 804, and other components have been removed for clarity. In some embodiments, the dielectric mount sleeve 228 may fasten the battery module 108 together and/or attach the battery module 108 to a vehicle mount base (see, e.g., mount base 812 of FIG. 8B). The dielectric mount sleeve 228 may be made from Garolite G10, fiberglass, ceramic coated materials, fiberglass-epoxy laminates, etc. As shown in FIG. 8A, the dielectric mount sleeves 228 may be disposed internal to a periphery of the battery module 108 and between battery cells 208. Among other things, this arrangement may allow for a more compact battery module 108 and one that does not require external clamping and/or fastening features.

Figure 8B:
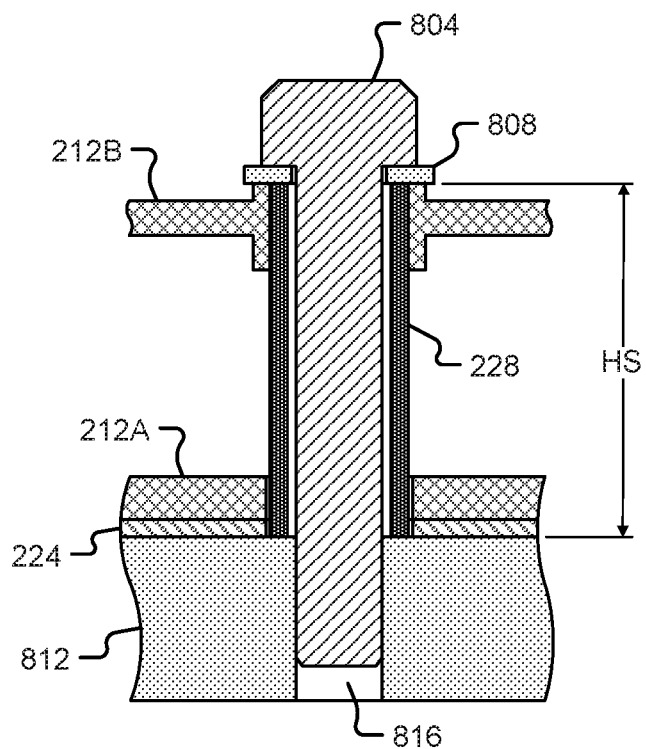
FIG. 8B shows a detail elevation section view of the dielectric mount sleeve of FIG. 8A.

FIG. 8B shows a detail elevation section view of the dielectric mount sleeve 228 of FIG. 8A. The dielectric mount sleeve 228 may be configured as a hollow shaft, having a total height, HS. The height, HS, of the dielectric mount sleeve 228 may define the maximum height from the cover 212B to the bottom of the cooling plate 224 and may even define the height of the battery module 108. In some cases, a fastener 804 may be inserted into the hollow shaft of the dielectric mount sleeve 228 and into a receiving feature 816 in, or associated with, the mount base 812. In some embodiments, this receiving feature 816 may be a nut, threaded hole, and/or some other mating interconnection between the mount base 812 and the fastener 804. In one embodiment, the fastener may be used to hold the upper shield 204 and other battery module 108 components together. Although shown as a washer 808, or other load distributing member, in contact with the cover 212B in FIG. 8B, it should be appreciated that the washer 808, or even the head of the fastener 804, may apply a compressive, or clamping, force to the upper shield 204 holding the housing 212 components (e.g., lower housing 212A, cover 212B, etc.) together between the cooling plate 224 and the upper shield 204.

As illustrated in FIG. 8B, as a force is applied to the fastener 804, providing a clamping load for the battery module 108, the load transmits to the dielectric mount sleeve 228 rather than the housing 212 and other battery module 108 components alone. In some embodiments, the load or compressive force imparted by overtightening the assembly fastener 804 may be resisted by the dielectric fastening sleeve 228 such that the lower housing 212A and cover 212B of the battery module 108 do not, and cannot, substantially deform, crack, or bend.

The exemplary systems and methods of this disclosure have been described in relation to a battery module 108 and a number of battery cells 208 in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a battery module, comprising: a housing comprising a base and sidewalls extending from a periphery of the base, the sidewalls and base defining a first containment cavity having a first volume, wherein the base comprises a plurality of receptacles formed therein, the plurality of receptacles arranged in a battery cell distribution pattern, wherein each receptacle in the plurality of receptacles is sized to receive a battery cell; an array of battery cells at least partially disposed within the first volume, the array of battery cells comprising base portions disposed in the plurality of receptacles of the housing and arranged in the battery cell distribution pattern providing an open volume surrounding each battery cell in the array of battery cells; and a structural adhesive disposed in the first volume of the housing and around each battery cell in the array of battery cells, the structural adhesive filling the open volume surrounding each battery cell mechanically coupling each battery cell in the array of battery cells together in a force distribution framework.

Aspects of the above battery module further comprise a cover comprising an upper surface and walls extending from a periphery of the upper surface, the walls and upper surface defining a second containment cavity having a second volume, wherein the cover is attached to the housing along at peripheral contacting surfaces of the walls and sidewalls, wherein upper portions of the array of battery cells are at least partially disposed in the second volume of the cover, wherein the upper portions of the array of battery cells are disposed opposite the base portions of the array of battery cells. Aspects of the above battery module include wherein the cover comprises a plurality of receptacles formed in the upper surface and arranged in the battery cell distribution pattern, wherein each receptacle in the plurality of receptacles formed in the upper surface is sized to receive a battery cell in the array of battery cells. Aspects of the above battery module include wherein the sidewalls of the housing include a flanged surface following at least a portion of the periphery of the base, the flanged surface offset from and substantially parallel to the base, wherein the walls of the cover include a mating flanged surface configured to mate with the flanged surface of the housing. Aspects of the above battery module include wherein the cover is temporarily attached to the housing via an adhesive layer disposed between the flanged surface of the sidewalls and the mating flanged surface of the cover, and wherein each battery cell in the array of battery cells is held in the battery cell distribution pattern via the plurality of receptacles formed in the base of the housing and the upper surface of the cover. Aspects of the above battery module include wherein the structural adhesive contacts surfaces of the sidewalls of the housing and the walls of the cover mechanically joining the housing, cover, and battery cells in the array of battery cells into a unified and integral structure. Aspects of the above battery module further comprise a battery cell retaining form comprising a substantially planar surface including an array of receptacles formed therethrough, the array of receptacles formed in the battery cell distribution pattern and configured to receive at least a portion of the array of battery cells. Aspects of the above battery module further comprise a dielectric fastening sleeve disposed between four adjacent battery cells in the array of battery cells, the dielectric fastening sleeve comprising a hollow shaft extending longitudinally from the upper surface of the cover through the base of the housing to a mount frame, the hollow shaft configured to receive an assembly fastener, wherein the battery module is fastened to a mount frame via the assembly fastener, and wherein a height of the hollow shaft defines a height of the battery module. Aspects of the above battery module include wherein a load or compressive force imparted by overtightening the assembly fastener is resisted by the dielectric fastening sleeve such that the housing and cover of the battery module do not substantially deform.

Embodiments include an energy storage device, comprising: a plurality of energy storage cells arranged in a number of spaced apart linear rows, wherein each energy storage cell in the plurality of storage cells is spaced apart from one another providing an open volume surrounding each energy storage cell; a carrier comprising a plurality of sidewalls and an upper and lower surface, the carrier including an internal void, wherein the plurality of energy storage cells are disposed at least partially within the internal void of the carrier; and a structural adhesive disposed in the internal void of the carrier, the structural adhesive filling the open volume surrounding each energy storage cell and at least a portion of the internal void of the carrier, the structural adhesive mechanically coupling each energy storage cell in the plurality of energy storage cells and the carrier together in a force distribution framework.

Aspects of the above energy storage device further comprise a cover forming the upper surface and a first portion of the plurality of sidewalls, wherein the first portion of the plurality of sidewalls extends from a periphery of the upper surface, the first portion of the plurality of sidewalls and upper surface defining a first volume of the internal void; and a housing forming the lower surface and a second portion of the plurality of sidewalls, wherein the second portion of the plurality of sidewalls extends from a periphery of the lower surface, the second portion of the plurality of sidewalls and upper surface defining a second volume of the internal void, wherein the first portion of the plurality of sidewalls are connected to the second portion of the plurality of sidewalls via mating flanged surfaces following at least a portion of the periphery of the carrier, the flanged surfaces offset from and substantially parallel to the upper and lower surfaces. Aspects of the above energy storage device further comprising an adhesive layer disposed between and in contact with the mating flanged surfaces of the first and second portions of the plurality of sidewalls. Aspects of the above energy storage device include wherein the structural adhesive contacts surfaces of the plurality of sidewalls in the internal void of the carrier and external surfaces of each energy storage cell in the plurality of energy storage cells mechanically joining the carrier and energy storage cells in the plurality of energy storage cells into a unified and integral structure. Aspects of the above energy storage device include wherein the energy storage devices are one or more of battery cells, capacitors, supercapacitors, and/or ultracapacitors. Aspects of the above energy storage device further comprising: a retaining form gasket comprising a substantially planar surface including receptacles arranged in the number of spaced apart linear rows and formed completely through the retaining form gasket, wherein each receptacle is sized to receive a portion of each energy storage cell in the plurality of energy storage cells in the energy storage device. Aspects of the above energy storage device include wherein the retaining form gasket maintains the plurality of energy storage cells in a position spaced apart from one another, wherein the retaining form gasket is disposed in the first volume of the internal void. Aspects of the above energy storage device further comprising: a nonconductive standoff disposed between four adjacent energy storage cells in the plurality of energy storage cells, the nonconductive standoff comprising a hollow shaft extending longitudinally from the upper surface of the carrier through the lower surface of the carrier to a surface of a mount frame, the hollow shaft receiving a fastener clamping the carrier and plurality of energy storage cells to the mount frame, wherein a height of the hollow shaft defines a height of the energy storage device, wherein the structural adhesive contacts a surface of the nonconductive standoff mechanically joining the nonconductive standoff in the unified and integral structure of the energy storage device.

Embodiments include a battery for an electric vehicle, comprising: a plurality of battery modules electrically interconnected with one another, wherein each battery module of the plurality of battery modules comprises: a housing comprising a base and sidewalls extending from a periphery of the base, the sidewalls and base defining a first containment cavity having a first volume, wherein the base comprises a plurality of receptacles formed therein, the plurality of receptacles arranged in a battery cell distribution pattern, wherein each receptacle in the plurality of receptacles is sized to receive a battery cell; an array of battery cells at least partially disposed within the first volume, the array of battery cells comprising base portions disposed in the plurality of receptacles of the housing and arranged in the battery cell distribution pattern providing an open volume surrounding each battery cell in the array of battery cells; and a structural adhesive disposed in the first volume of the housing and around each battery cell in the array of battery cells, the structural adhesive filling the open volume surrounding each battery cell mechanically coupling each battery cell in the array of battery cells together in a force distribution framework.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A battery module, comprising:
    a housing comprising a base and sidewalls extending from a periphery of the base, the base and sidewalls defining a first containment cavity having a first volume, wherein the sidewalls comprise a flanged surface following at least a portion of the periphery of the base, the flanged surface offset from and substantially parallel to the base, wherein the base comprises a plurality of receptacles formed therein, the plurality of receptacles arranged in a battery cell distribution pattern, and wherein each receptacle in the plurality of receptacles is sized to receive a battery cell;
    an array of battery cells at least partially disposed within the first volume, the array of battery cells comprising base portions disposed in the plurality of receptacles of the housing, thereby providing an open volume surrounding each battery cell in the array of battery cells;
    a structural adhesive disposed in the first volume of the housing and around each battery cell in the array of battery cells, the structural adhesive filling the open volume surrounding each battery cell and mechanically coupling each battery cell in the array of battery cells together in a force distribution framework; and
    a cover comprising an upper surface and walls extending from a periphery of the upper surface, the walls and upper surface defining a second containment cavity having a second volume, wherein the walls of the cover comprise a mating flanged surface that mates with the flanged surface of the sidewalls of the housing attaching the cover to the housing.

2. The battery module of claim 1,
    wherein upper portions of the array of battery cells are at least partially disposed in the second volume of the cover, and wherein the upper portions of the array of battery cells are disposed opposite the base portions of the array of battery cells.

3. The battery module of claim 2, wherein the cover comprises a plurality of receptacles formed in the upper surface and arranged in the battery cell distribution pattern, and wherein each receptacle in the plurality of receptacles formed in the upper surface is sized to receive a battery cell in the array of battery cells.

4. The battery module of claim 3, wherein the cover attaches to the housing via an adhesive layer disposed between the flanged surface of the sidewalls of the housing and the mating flanged surface of the walls of the cover.

5. The battery module of claim 4, wherein each battery cell in the array of battery cells is held in the battery cell distribution pattern via the plurality of receptacles formed in the base of the housing and the upper surface of the cover.

6. The battery module of claim 5, wherein the structural adhesive contacts surfaces of the sidewalls of the housing and the walls of the cover to join mechanically the housing, cover, and battery cells in the array of battery cells into a unified and integral structure.

7. The battery module of claim 6, further comprising:
a battery cell retaining form comprising a substantially planar surface including an array of receptacles formed therethrough, the array of receptacles formed in the battery cell distribution pattern and configured to receive at least a portion of the array of battery cells.

8. The battery module of claim 7, wherein the battery cell retaining form is disposed adjacent to the upper portions of the array of battery cells and in the second volume of the cover.

9. The battery module of claim 8, wherein the array of receptacles formed in the battery cell retaining form are sized to prevent structural adhesive from expanding through the array of receptacles as the structural adhesive cures in the housing, the structural adhesive further mechanically joining the battery cell retaining form as part of the unified and integral structure.

10. The battery module of claim 6, further comprising:
a dielectric fastening sleeve disposed between four adjacent battery cells in the array of battery cells, the dielectric fastening sleeve comprising a hollow shaft extending longitudinally from the upper surface of the cover through the base of the housing to a mount frame, the hollow shaft configured to receive an assembly fastener, wherein the battery module is fastened to the mount frame via the assembly fastener, and wherein a height of the hollow shaft defines a height of the battery module.

11. The battery module of claim 10, wherein a load or compressive force imparted by overtightening the assembly fastener is resisted by the dielectric fastening sleeve such that the housing and cover of the battery module do not substantially deform.

12. An energy storage device, comprising:
a plurality of energy storage cells arranged in a number of spaced apart linear rows, wherein each energy storage cell in the plurality of storage cells is spaced apart from one another providing an open volume surrounding each energy storage cell;
a carrier comprising a plurality of sidewalls and an upper surface and a lower surface, the carrier including an internal void, wherein the plurality of energy storage cells are disposed at least partially within the internal void of the carrier, and wherein the carrier further comprises:
a cover forming the upper surface and a first portion of the plurality of sidewalls, wherein the first portion of the plurality of sidewalls extends from a periphery of the upper surface, the first portion of the plurality of sidewalls and upper surface defining a first volume of the internal void;
a housing forming the lower surface and a second portion of the plurality of sidewalls, wherein the second portion of the plurality of sidewalls extends from a periphery of the lower surface, the second portion of the plurality of sidewalls and upper surface defining a second volume of the internal void, wherein the first portion of the plurality of sidewalls is connected to the second portion of the plurality of sidewalls via mating flanged surfaces following at least a portion of the periphery of the carrier, the flanged surfaces being offset from and substantially parallel to the upper and lower surfaces; and
a structural adhesive disposed in the internal void of the carrier, the structural adhesive filling the open volume surrounding each energy storage cell and at least a portion of the internal void of the carrier, the structural adhesive mechanically coupling each energy storage cell in the plurality of energy storage cells and the carrier together in a force distribution framework.

13. The energy storage device of claim 12, further comprising an adhesive layer disposed between and in contact with the mating flanged surfaces of the first and second portions of the plurality of sidewalls.

14. The energy storage device of claim 13, wherein the structural adhesive contacts surfaces of the plurality of sidewalls in the internal void of the carrier and external surfaces of each energy storage cell in the plurality of energy storage cells to join mechanically the carrier and energy storage cells in the plurality of energy storage cells into a unified and integral structure.

15. The energy storage device of claim 14, wherein the energy storage devices are one or more of battery cells, capacitors, supercapacitors, and/or ultracapacitors.

16. The energy storage device of claim 15, further comprising:
a retaining form gasket comprising a substantially planar surface including receptacles arranged in the number of spaced apart linear rows and formed completely through the retaining form gasket, wherein each receptacle is sized to receive a portion of each energy storage cell in the plurality of energy storage cells in the energy storage device.

17. The energy storage device of claim 16, wherein the retaining form gasket maintains the plurality of energy storage cells in a position spaced apart from one another, and wherein the retaining form gasket is disposed in the first volume of the internal void.

18. The energy storage device of claim 15, further comprising:
a nonconductive standoff disposed between four adjacent energy storage cells in the plurality of energy storage cells, the nonconductive standoff comprising a hollow shaft extending longitudinally from the upper surface of the carrier through the lower surface of the carrier to a surface of a mount frame, the hollow shaft receiving a fastener clamping the carrier and plurality of energy storage cells to the mount frame, wherein a height of the hollow shaft defines a height of the energy storage device, and wherein the structural adhesive contacts a surface of the nonconductive standoff mechanically joining the nonconductive standoff in the unified and integral structure of the energy storage device.

19. A battery for an electric vehicle, comprising:
a plurality of battery modules electrically interconnected with one another, wherein each battery module of the plurality of battery modules comprises:
a housing comprising a base and sidewalls extending from a periphery of the base, the sidewalls and base defining a first containment cavity having a first volume, wherein the sidewalls comprise a flanged surface following at least a portion of the periphery of the base, the flanged surface being offset from and substantially parallel to the base, wherein the base comprises a plurality of receptacles formed therein, the plurality of receptacles being arranged in a battery cell distribution pattern, and wherein each receptacle in the plurality of receptacles is sized to receive a battery cell;

an array of battery cells at least partially disposed within the first volume, the array of battery cells comprising base portions disposed in the plurality of receptacles of the housing, thereby providing an open volume surrounding each battery cell in the array of battery cells;

a structural adhesive disposed in the first volume of the housing and around each battery cell in the array of battery cells, the structural adhesive filling the open volume surrounding each battery cell to couple mechanically each battery cell in the array of battery cells together in a force distribution framework; and a cover comprising an upper surface and walls extending from a periphery of the upper surface, the walls and upper surface defining a second containment cavity having a second volume, wherein the walls of the cover comprise a mating flanged surface that mates with the flanged surface of the sidewalls of the housing attaching the cover to the housing.

20. The battery of claim 19, wherein the cover comprises a plurality of receptacles formed in the upper surface and arranged in the battery cell distribution pattern, and wherein each receptacle in the plurality of receptacles formed in the upper surface is sized to receive a battery cell in the array of battery cells.

* * * * *